US005866901A

United States Patent [19]

Penn et al.

[11] Patent Number: 5,866,901

[45] Date of Patent: Feb. 2, 1999

[54] APPARATUS FOR AND METHOD OF ION DETECTION USING ELECTRON MULTIPLIER OVER A RANGE OF HIGH PRESSURES

[75] Inventors: Stephen M. Penn, Fairfield, N.J.; C. Bruce McAllister, San Jose, Calif.

[73] Assignee: MKS Instruments, Inc., Andover, Mass.

[21] Appl. No.: 760,973

[22] Filed: Dec. 5, 1996

[51] Int. Cl.[6] .............................. B01D 59/44; H01J 49/00

[52] U.S. Cl. .................... 250/281; 250/283; 313/103 CM

[58] Field of Search ..................................... 250/281, 283; 313/103 CM

[56] References Cited

U.S. PATENT DOCUMENTS

| | | | |
|---|---|---|---|
| 3,824,390 | 7/1974 | Magyar | 250/294 |
| 5,115,667 | 5/1992 | Baret | 73/40 |
| 5,302,827 | 4/1994 | Foley | 250/292 |
| 5,446,275 | 8/1995 | Sakai et al. | 250/283 |
| 5,644,220 | 7/1997 | Urs et al. | 324/71.3 |
| 5,665,966 | 9/1997 | Dahl et al. | 250/283 |

OTHER PUBLICATIONS

Kurz, E. A. "Channel electron multipliers" *American Laboratory,* Mar. 1979.

Dietz, L. A. et al. "Electron multiplier–scintillator detector for pulse counting positive or negative ions" *Rev. Sol. Instrum.,* vol. 49, No. 8, Sep. 1978.

Laprade B. N. et al. "The Operation of Single Channel Electron Multipliers in Extreme Environments" *Mass Spec. Source,* vol. XIV, No. 3, 1991.

*Primary Examiner*—Bruce Anderson
*Attorney, Agent, or Firm*—Lappin & Kusmer LLP

[57] ABSTRACT

Ions in a chamber or space are detected using an electron multiplier operating at relatively low gain. The electron multiplier is placed in communication with the chamber, such as a chamber of a mass spectrometer, such that ions from the chamber enter the electron multiplier. A bias voltage applied to the multiplier sets the gain of the multiplier. By setting the gain at a relatively low value, the gain of the multiplier remains independent of chamber pressure, such that an accurate pressure measurement is obtained without calibration at a particular pressure or as a function of pressure.

40 Claims, 5 Drawing Sheets

APPARATUS FOR AND METHOD OF ION DETECTION USING ELECTRON MULTIPLIER OVER A RANGE OF HIGH PRESSURES

FIELD OF THE INVENTION

The present invention relates generally to electron multipliers, and more particularly to an electron multiplier for measuring the pressures (and thus the volumetric number densities) of gases over a large range of pressures.

BACKGROUND OF THE INVENTION

In many applications, it is desirable to detect the presence of ions in a chamber or space. For example, in a mass spectrometer, ions of the various gas constituents are detected to determine the partial pressure of each gas constituent in a chamber and compared to the detected total pressure of the gas within the chamber. By detecting the partial pressure of each particular gas constituent, as well as the total pressure of the combined gases within the chamber, useful information can be acquired. For example, both total and partial pressures are proportional to the corresponding volumetric number density, respectively, of the total and constituent gases, thus providing information of the quantity of each gas constituent that is present. Knowledge of total and partial pressures is useful, for example, for detecting leaks in a system. For this and other reasons, it is highly desirable to measure both total and partial pressures as accurately and precisely as possible.

In conventional mass spectrometers and other systems, measurement of the partial and total pressures of the gases is based upon the probability of an electron colliding with a neutral atom or molecule, and thereby creating a positive ion. The probability is proportional to the volume number density of the neutral atom or molecule along the electron flight path. The probability is a function of the partial and total pressures, with the probability increasing with increasing pressure. Ions thus are measured within the chamber. In quadrupole mass spectrometers, partial pressures are measured using a quadrupole mass filter assembly and an ion current measurement device, positioned at the output of the filter assembly within the chamber, having a surface which (a) is exposed to the ions exiting the filter, and (b) generates a current when positively ionized particles contact a surface of the device. A current measurement instrument is used to measure the current which is proportional to the total volumetric number density of the neutral atoms or molecules of the gas constituent being measured, and therefore is proportional to the partial pressure of the neutral atoms or molecules of that gas. Thus, knowledge of the current due to ions contacting the surface provided with the current measurement instrument provides knowledge of the partial pressure of each constituent gas. Typically, the surface provided with the current measuring instrument is an ion detector which includes a device commonly known as a Faraday plate or cup. Charged ions strike the Faraday plate causing an ion current to be generated in the plate.

The Faraday plate is useful for detecting ions at relatively high chamber pressures, and in fact a second Faraday plate or cup can be used in the chamber to measure the total pressure in the chamber by continually detecting positive ions created in the chamber from all of the constituent gases. However, at low pressures, where the ion current is low, it is often desirable to enhance the sensitivity of the ion detector. One solution is to detect the ions with an electron multiplier. Electrons produced by the multiplier are collected by an anode or electron collector. Current at the anode is measured to quantify the electrons and to indicate the input ion current.

More specifically, an electron multiplier typically includes an ion/electron converter typically comprising a layer of doped resistive material. Electrons emitted from the converter in response to detected ions are increased (or multiplied) by a predetermined factor so as to create additional or secondary electrons measured through a more easily detected dynamic range. The space in which the number of electrons are multiplied is typically subjected to a bias voltage applied across the length of the multiplier space. The bias voltage creates an electric field gradient. Ions from the chamber enter the multiplier and strike the surface of the ion/electron converter, resulting in the release of electrons from the surface. Additional or secondary electron generating surfaces are provided within the field gradient so that when an electron travels through the field gradient and strikes one of these surfaces, there is a high probability that multiple secondary electrons are generated from the surface for each electron that strikes the surface. These secondary electrons are accelerated by the electric field such that they in turn strike another internal surface to cause the release of more secondary electrons, and so on. Finally, the secondary electrons exit the multiplier and strike the anode. The current at the anode is measured to quantify the electrons exiting the multiplier. In principle, since the gain of the multiplier, i.e., the number of electrons exiting the multiplier for each ion entering, is known, the number of electrons measured provides a determination of the number of ions and, therefore, the measured pressure. The predetermined factor or gain of typical electron multipliers used in presently available mass spectrometers typically varies from as low as 1000 to as high as 10,000,000.

The gain of the multiplier is determined by several of its characteristics and operating parameters, including the multiplier geometry and composition and the applied bias voltage level creating the electric field gradient. Given a particular multiplier, the gain is controllable by varying the bias voltage so as to vary the electric field gradient, although in the prior art it is assumed that the gain remains fixed during operation of the electron multiplier. Ideally, the gain of the multiplier is independent of pressure in the chamber. However, certain phenomena that occur within the multiplier cause the gain to vary with chamber pressure. One such phenomenon is referred to as ion feedback, which causes the gain to increase rapidly with increased pressure, particularly at high gain.

Ion feedback occurs when one or more of the secondary electrons inside the multiplier strike gas molecules with sufficient energy to ionize them. The resulting ions and electrons are accelerated by the electric field within the multiplier until they collide with an internal surface, causing more secondary electrons to be released and to produce still more secondary electrons. The result is more electrons exiting the multiplier for a given gain (bias voltage).

At low pressures, very few gas molecules are present in the multiplier and, therefore, the relatively small effects of ion feedback are negligible. However, at higher pressures, many more gas molecule collisions take place, and the gain of the multiplier varies rapidly with chamber pressure. Significant ion feedback typically occurs when the pressure at the electron multiplier is above 1.0 millitorr. As a result, the electron current measurement taken at the output end of the multiplier no longer provides a reliable measurement of the number of ions entering the multiplier, and inaccuracies are introduced into the pressure measurement. Further, operating at very high gains and high pressures increases the chances of voltage discharge and/or breakdown, as well as decreases the useful life of the multiplier by increasing the number of collisions with the doped inner surfaces of the multiplier. For this reason, electron multipliers of the prior art typically are not operated when the pressure at the electron multiplier is above 0.5 millitorr.

Presently, there are quadrupole mass spectrometers designed to operate at pressures up to about 20 mtorr. At least one of these spectrometers uses a Faraday cup ion detector, which as described above, does not have good performance at very low pressures. At least another of these prior art spectrometers includes both an electron multiplier with a collection anode and a Faraday cup to detect ions in a mass spectrometer. As a solution to the dependence of gain on gas pressure, this prior art system uses the electron multiplier for low pressures and the Faraday cup at high pressures. Specifically, at low pressures, ions entering the electron multiplier are multiplied as described above, and the electrons produced thereby are collected by the anode. The anode current is measured. As the pressure increases beyond a predetermined threshold (the threshold being equal to or less than 1.0 mtorr), within the 1.0–20.0 mtorr range, the multiplier is not used, but instead the ion current is measured directly with the Faraday cup. In such a system, the low-noise amplification benefits of the electron multiplier are forfeited at these higher pressures.

OBJECTS OF THE INVENTION

It is a general object of the present invention to provide an improved electron multiplier which substantially overcomes or reduces the above-identified problems of the prior art.

Another, more specific object of the present invention is to improve the small-signal detection capabilities of a mass spectrometer operating at relatively high pressure.

And another object of the present invention is to provide an electron multiplier ion detector having improved ion detection capabilities through a broader range of pressures including pressures where in the prior art devices, described above, ion feedback can be significant, i.e., above 1.0 mtorr.

Yet another object of the present invention is to provide an improved electron multiplier ion detector useful in detecting ions up to 100 mtorr or greater without the need to calibrate the gain as a function of gas pressure.

Still another object of the present invention is to provide the benefits of the low-noise amplification of an electron multiplier while eliminating the high-gain nonlinearities found in prior systems at high pressures.

And yet another object of the present invention is to operate an electron multiplier at relatively low gain so as to eliminate the possibility of voltage discharge and/or breakdown that can become likely at high bias voltages (high gain) and high pressures, as well as increasing the useful life of the multiplier by reducing collisions with the doped inner surfaces of the multiplier.

SUMMARY OF THE INVENTION

These and other objects are achieved by an ion detection system and method used to measure a pressure in a space or chamber which eliminate the drawbacks associated with the variation in electron multiplier gain at high pressure. The measured pressure can be a total chamber pressure or one or more partial pressures associated with particular constituents of the contents of the space or chamber. In the method of the invention, an electron multiplier is immersed in the space or chamber having a relatively high total pressure. In one embodiment, the total pressure is within the range of about 0.1 to about 100 millitorr. The gain of the multiplier is adjusted to a relatively low level, i.e., a level at which the gain is substantially constant with respect to total pressure. In one embodiment, at this low gain setting, the output electron current from the electron multiplier varies linearly with the total pressure and/or the partial pressure of a constituent gas. An ion is received at a receiving end of the multiplier. The resulting electrons exiting the multiplier are detected to determine the measured pressure within the space.

In one embodiment, the system and method of the invention are used to measure pressure in a mass spectrometer. In one particular embodiment, the mass spectrometer is a quadrupole mass spectrometer. In that embodiment, the ions entering the electron multiplier are taken from the output of a quadrupole mass filter in the mass spectrometer.

In one embodiment, the system and method of the invention are used to measure the total pressure within the chamber of the mass spectrometer. The invention can also be used to measure partial pressures of particular constituent gases and is therefore applicable to measurement of gases introduced into a process chamber during semiconductor processes such as phase vapor deposition (PVD) and is also applicable to residual gas analysis (RGA) in which the amounts of low-pressure residual gases in a chamber are measured.

In one embodiment, an adjustable voltage source is connected across the electron multiplier to apply the bias voltage. The source can be adjusted to set the gain of the multiplier at a desired level. In accordance with the present invention, the bias voltage is set to adjust the gain to a relatively low level to maintain a near constant gain with pressure. In one embodiment, the gain is adjusted to a value below 1000. In one particular embodiment, the gain is adjusted to a value between about 10 and about 100.

The invention is applicable to any type of electron multiplier. Specifically, the multiplier can be a discrete dynode type, a continuous channel electron multiplier (CEM) type, a continuous microchannel plate (MCP) type or other type of multiplier.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
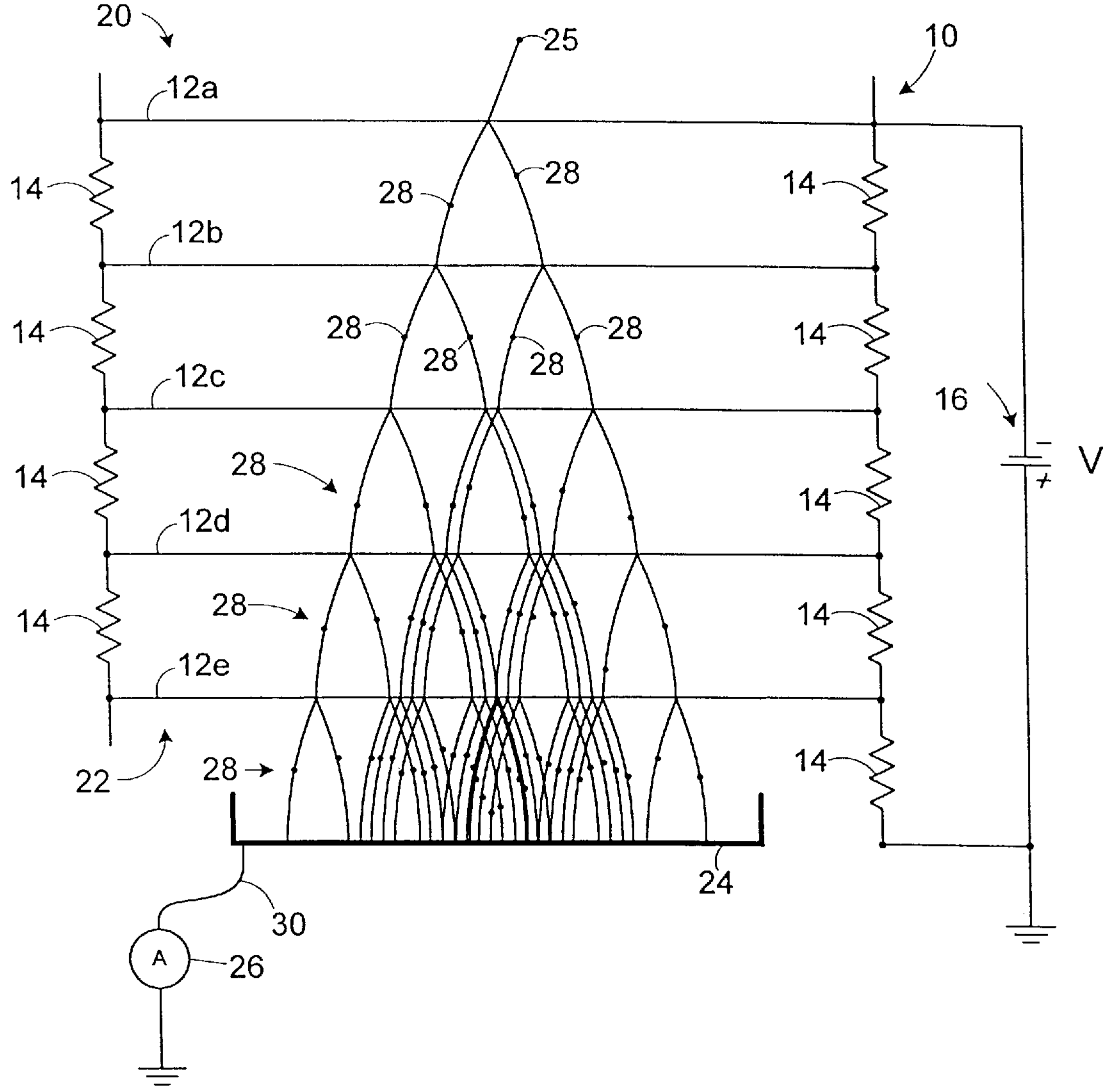
FIG. 1 is a schematic diagram which illustrates operation of a discrete dynode electron multiplier in accordance with the present invention.

FIG. 1 is a schematic functional diagram which illustrates operation of a discrete dynode electron multiplier 10 in accordance with one embodiment of the present invention. The multiplier 10 includes multiple dynodes 12*a*–12*e* separated from each other by a resistance, indicated in FIG. 1 as discrete resistors 14. The multiplier includes an input end 20 which can be placed in communication with a space or chamber whose pressure is to be measured. For example, the input end 20 can be connected to the output end of a mass filter in a mass spectrometer. Ions enter the multiplier 10 through the input end 20 and cause electrons to exit the multiplier 10 through the output end 22.

A voltage source 16 is connected across the multiplier 10 as shown to generate an electric field within the interior 18 of the multiplier 10. In one embodiment, the electric field is characterized by a potential which increases in the direction from the input end 20 to the output end 22.

Electrons 28 exiting the multiplier 10 can be collected by an anode or collector 24. The anode 24 is connected by a line 30 to a current measuring device 26 such as an electrometer.

In operation, an ion 25 enters the multiplier 10 at the input end 20 and strikes the first dynode 12*a*. The first dynode functions as an ion-to-electron converter. The collision thus causes multiple electrons 28 to be emitted from the dynode 12*a*. These "secondary" electrons are accelerated by the electric field toward the output end 22 of the multiplier 10. They collide with the next dynode 12*b*, causing more secondary electrons to be released into the interior of the multiplier 10. These new secondary electrons 28 accelerate to the next dynode where they cause still more electrons to be released.

This multiplication process continues to the output end 22 of the multiplier 10. The electrons 28 exiting the multiplier and striking the anode 24 induce in the line 30 a current which is measured by the electrometer 26. The measured current is used to quantify the ions entering the multiplier 10.

Ion feedback occurs when one or more of the electrons 28 strike gas molecules within the interior 18 of the multiplier. If an electron strikes a molecule with sufficient energy to ionize it, a positively charged ion and one or more electrons can be produced in the multiplier 10. They can strike the dynodes 12 with sufficient energy to cause additional secondary electrons to be released and multiplied by the process described above. These additional electrons can adversely affect the current measurement taken at the output end of the multiplier.

The gain of the multiplier 10 is a measure of the number of electrons 28 produced at the output of the multiplier for each ion 25 entering the multiplier. In general, it is dependent upon the number of stages in the multiplier and the number of electrons produced by each collision. In one embodiment, the gain is given by $G=n^{\gamma}$, where G is the gain, $\gamma$ is the number of stages and n is the number of electrons released per collision. For a given multiplier configuration, at low pressures, the gain is constant with respect to the pressure within the multiplier.

In general, n is dependent upon the applied bias voltage V. Therefore, the gain G is actually also a function of bias voltage V. That is, $G(V)=[n(V)]^{\gamma}$.

Figure 2:
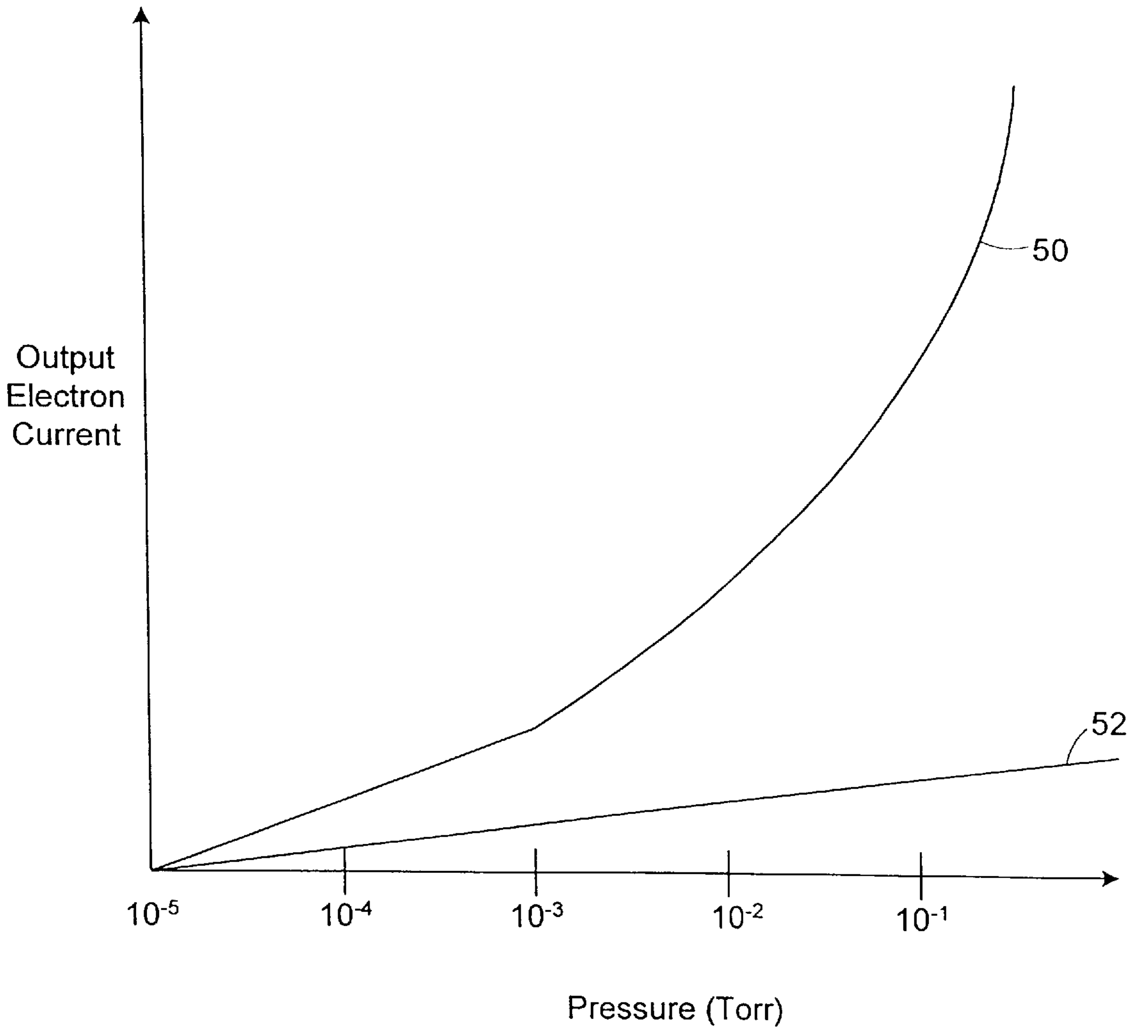
FIG. 2 is a graph which illustrates variation of output current with pressure in an electron multiplier at two gain levels.

FIG. 2 indicates that at high gain and high pressure, the gain G is also dependent upon pressure. FIG. 2 is a graphic representation of electron current measured at the output of the multiplier as a function of chamber pressure. In the curve labeled 50, the gain is set at a relatively high value, e.g., $10^4$. In the curve labeled 52, in accordance with the present invention the gain is set to a relatively low value, e.g., 100.

FIG. 2 illustrates that at high gain (curve 50), the measured multiplier output current varies approximately linearly with the chamber pressure at relatively low pressures, i.e., below about $10^{-3}$ torr. Therefore, at these pressures, the gain is constant with pressure. However, as the pressure increases above $10^{-3}$ torr, the response becomes nonlinear. The output current begins to rise rapidly with increasing pressure, due to the increasingly prevalent effects of ion feedback in the multiplier. As a result, the gain of the multiplier increases with increasing pressure. Because of this variation in gain, it becomes difficult to characterize the chamber pressure using the electron current measurement without some additional operation such as a calibration at the particular gain setting and pressure being used.

However, if the system is operated at a lower gain, the nonlinearity and its associated effects, namely, the variation in gain with pressure, can be eliminated. As shown by curve 52 in FIG. 2, at lower gain, e.g., between 10 and 100, the variation in output current with pressure remains linear, even through high pressures above $10^{-1}$ torr (i.e., 100 mtorr). The multiplier gain remains constant with pressure; therefore, the measured output current can be readily related to the chamber pressure to produce a more accurate pressure measurement.

The invention is also applicable to electron multipliers that are different from the discrete dynode type referred to above to illustrate the principles of the invention. For example, the invention is applicable to continuous channel electron multipliers (CEMs) such as those manufactured and sold by Galileo Electro-Optics Corporation of Sturbridge, Mass.

Figure 3:
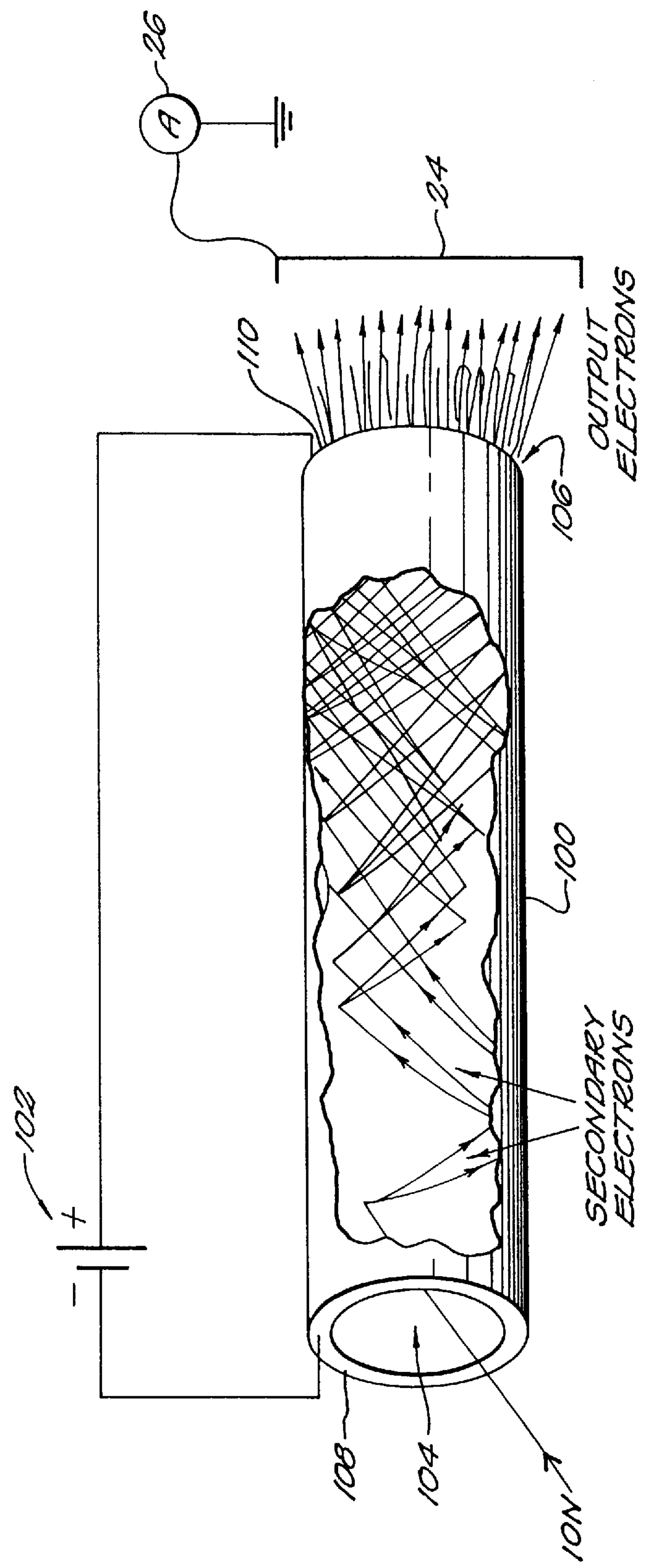
FIG. 3 is a schematic functional diagram, partially cut-away, which illustrates the present invention applied to a channel electron multiplier (CEM).

FIG. 3 is a schematic partially cut-away functional block diagram which illustrates the invention applied to a typical CEM 100. The input end 104 of the multiplier tube 100 is coated with a conductive electrode 108, and the output end 106 is coated with a conductive electrode 110. The voltage source 102 is connected across the multiplier tube 100 at the electrodes 108, 110 to apply the multiplier bias voltage.

Ions enter the input end 104 of the tube 100 and collide with the inner wall of the tube resulting in the emission of electrons. The inner wall thus functions as an ion-to-electron converter. The resulting secondary electrons are accelerated down the tube by the bias voltage. The electrons collide with the inner wall to release more electrons. The process repeats itself until the secondary electrons exit the tube 100 at the output end 106 where they are collected by the anode 24. The resulting current in line 30 is measured by the current measuring device 26.

Tests have shown that using a Galileo CEM at pressures between about $10^{-4}$ and $10^{-1}$ torr, the invention yields accurate measurements. With the gain set below 1000, particularly, between about 10 and about 100, the system response remains linear, the gain remains constant with pressure, and output current from the CEM is adequately high to permit pressure measurements at desired sensitivity and accuracy.

Figure 4:
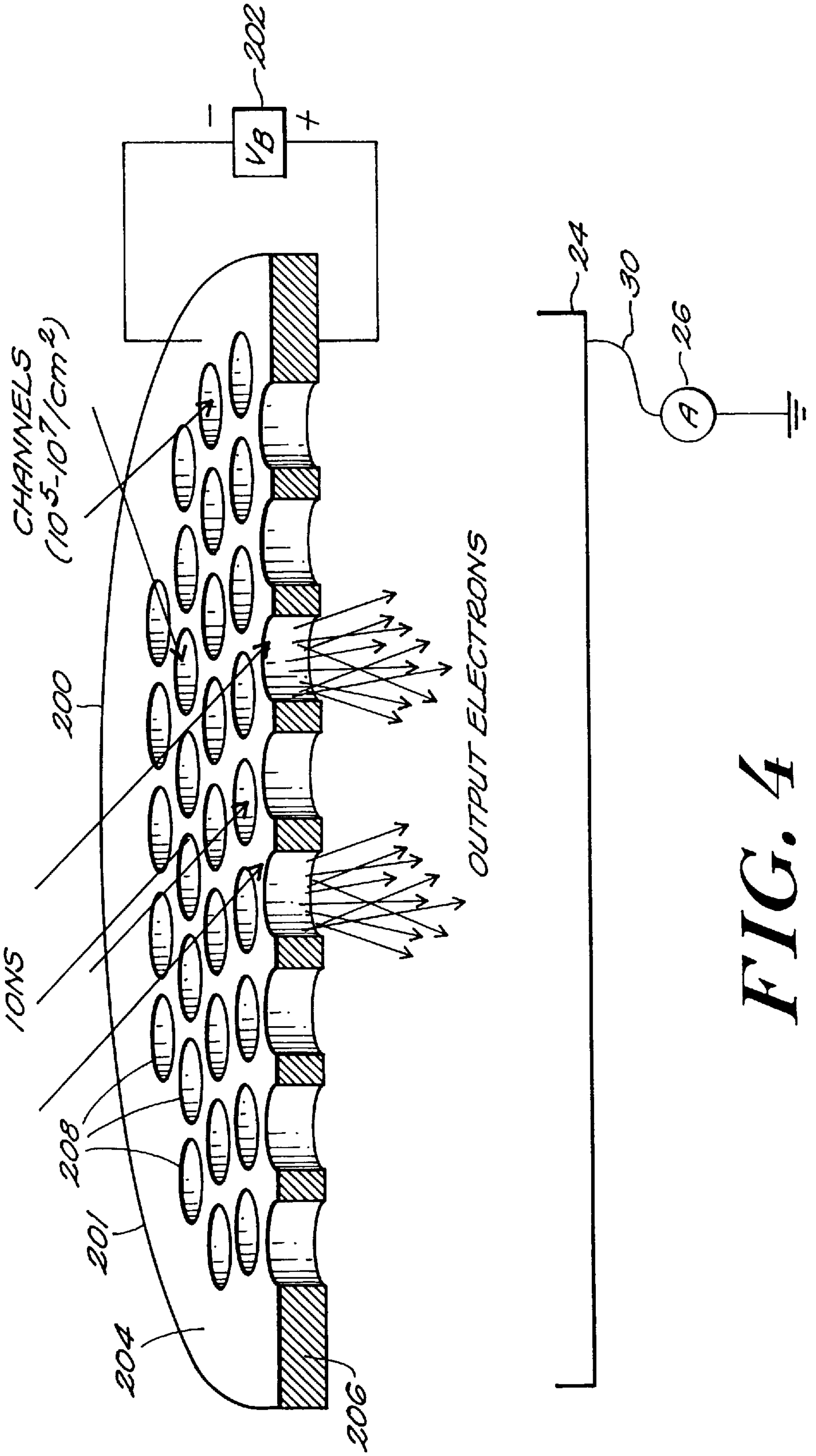
FIG. 4 is a schematic functional diagram, partially cut-away, which illustrates the present invention applied to a microchannel plate (MCP) electron multiplier.

The invention is also applicable to microchannel plate (MCP) electron multipliers such as those also manufactured and sold by Galileo Electro-Optics. FIG. 4 is a schematic functional diagram which illustrates the present invention applied to a MCP 200. The MCP 200 is made from a wafer 201 which can be a lead silicate glass wafer. The wafer 201 includes multiple holes or channels 208 formed through the wafer, each of which serves as a channel electron multiplier as described above in connection with FIG. 3. In one embodiment, the channels are on the order of 5–25 $\mu$m in diameter, are separated by a distance between centers on the order of 6–32 $\mu$m and have a length-to-diameter ratio of between 40:1 and 60:1. In one embodiment, the density of channels on the surface of the wafer is between $10^5$ and $10^7$ channels/cm$^2$.

The top surface 204 of the wafer 201 forms the input ends of the channels 208, and the bottom surface 206 forms the output ends of the channels 208. The top surface 204 and bottom surface 206 are coated with conductive material which serves as the electrodes to which the bias voltage source 202 is connected. As in the previously described embodiments, the bias voltage sets the gain of the channels 208.

In operation, ions enter the channels 208 at the top surface 204 as shown. The resulting multiplied output electrons exit the channels 208 at the bottom surface of the wafer 201. The output electrons are collected by the anode 24, and the current in line 30 is measured by the current measuring device 26.

Once again, by setting the bias voltage at source 202 to a sufficiently low level, the gain of the device is maintained at a relatively low level. The gain of the channels remains independent of pressure at high pressures and the device operates linearly to provide an accurate pressure measurement.

Figure 5:
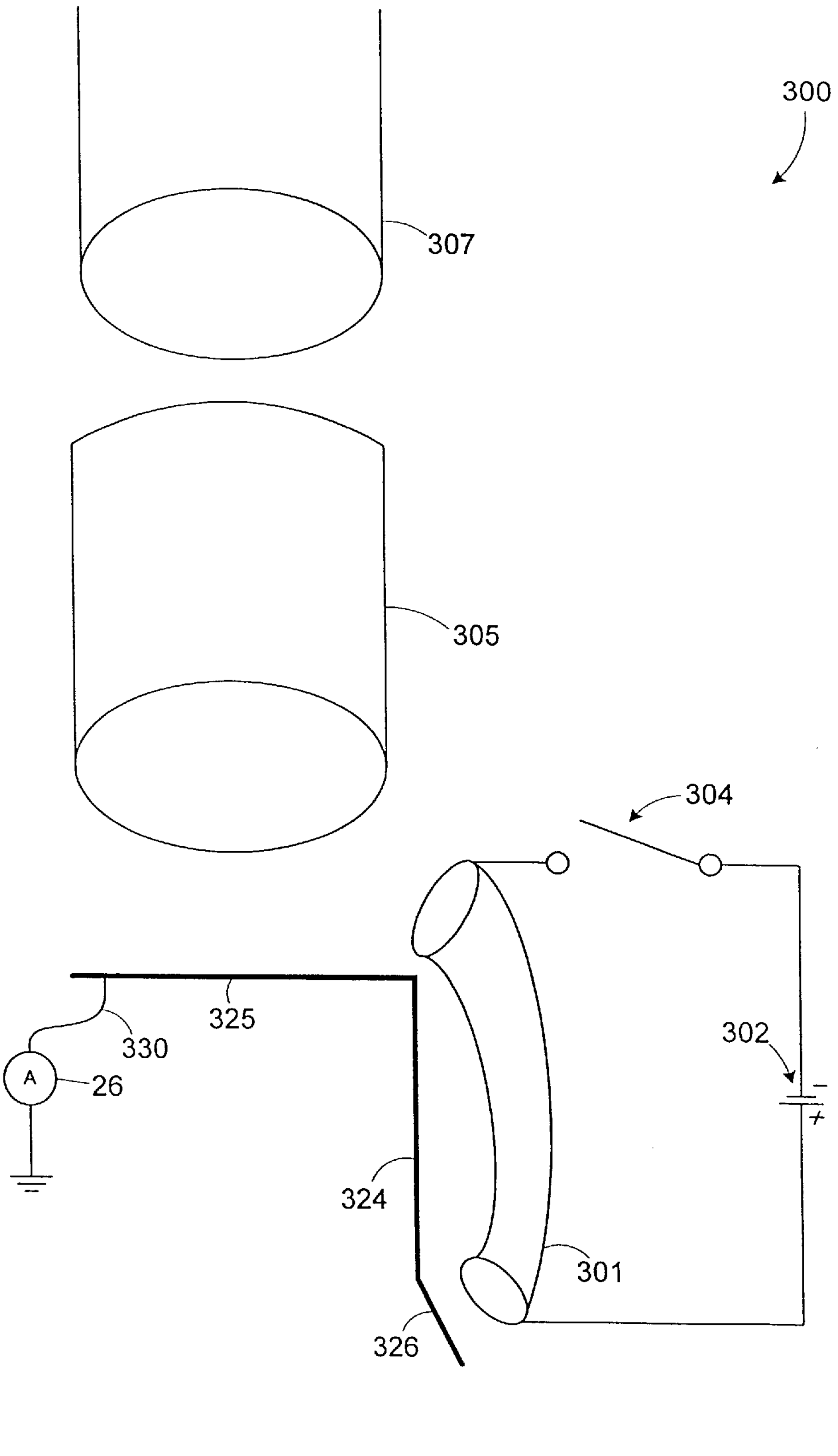
FIG. 5 is a schematic functional block diagram of one embodiment of a mass spectrometer using ion detection in accordance with the present invention.

FIG. 5 is a schematic functional block diagram of one embodiment of a mass spectrometer 300 using ion detection in accordance with the present invention. The mass spectrometer 300 includes an ion source 307 which directs ions into a mass filter 305. In this embodiment, ions exiting the mass filter 305 can enter the curved channel electron multiplier 301 or can be collected directly by the plate portion 325 of electrode 324, depending upon the state of switch 304.

If switch 304 is closed, the bias voltage at source 302 is applied across the multiplier 301. Positive ions exiting the mass filter 305 are attracted into the multiplier 301. The resulting electrons are collected by the anode portion 326 of the electrode 324, and the resulting current in line 330 is measured by the electrometer 26 to provide a pressure measurement, which can be a partial pressure measurement of a particular constituent gas or a total pressure measurement or any other pressure measurement.

If the switch 304 is open, the multiplier 301 is not activated, and positive ions exiting the mass filter 305 bypass the multiplier 301 and are collected by the plate portion 325 of the electrode 324. The resulting current in line 330 is measured by the electrometer 26.

FIG. 5 depicts one exemplary embodiment in which the Faraday plate 325 used to collect positive ions and the anode 326 used to collect multiplied electrons are parts of the same electrode 324. In addition, only a single electrometer 26 is used to measure current induced in the electrode 324. In another embodiment, a separate Faraday plate and anode, each with its own electrometer, can be used.

The method and system of the invention provide numerous advantages over prior approaches. For example, the small-signal detection capabilities of a mass spectrometer operating at relatively high pressure is improved. In addition, the method and system of the present invention provide an electron multiplier ion detector having improved ion detection capabilities through a broader range of pressures including pressures where in the prior art devices, described above, ion feedback can be significant, i.e., above 0.1 mtorr, and in fact the improved electron multiplier ion detector is useful in detecting ions up to 100 mtorr or greater without the need to calibrate the gain as a function of gas pressure. The invention provides the benefits of the low-noise amplification of an electron multiplier while eliminating the high-gain nonlinearities found in prior systems at high pressures. Because the behavior of the multiplier is linear and therefore readily characterized and predictable, the measurement of output current provides a more reliable indication of input ion quantities at high pressures than was possible with prior approaches. Also, by operating at relatively low gain, the invention eliminates the possibility of voltage discharge and/or breakdown that can become likely at high bias voltages (high gain) and high pressures. The invention also increases the useful life of the multiplier by operating at low gain and, as a result, reducing collisions with the doped inner surfaces of the multiplier. Finally, in the present invention, there is no appreciable variation in gain with pressure. As a result, there is no need for calibration as a function of pressure or at the operating pressure.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A method of operating an electron multiplier disposed in a space so as to measure a first pressure in the space and including means for setting the gain of the multiplier, said gain affecting the number of electrons exiting the electron multiplier, said electrons exiting the electron multiplier being indicative of the first pressure, the method comprising the steps of:

establishing a total pressure within the space in a pressure range between a lower limit above about 0.1 millitorr and an upper limit of about 100 millitorr; and setting the gain of the electron multiplier to a sufficiently low level that the gain is substantially constant with variations in the total pressure.

2. The method of claim 1, wherein the method further includes the steps of:

receiving an ion at a receiving end of the electron multiplier from the space; and detecting electrons exiting the electron multiplier to determine the first pressure.

3. The method of claim 1, wherein the first pressure is a partial pressure of a constituent of the contents of the space.

4. The method of claim 1, wherein the first pressure is the total pressure in the space.

5. The method of claim 1, wherein the electron multiplier is a discrete dynode multiplier.

6. The method of claim 1, wherein the electron multiplier is a channel electron multiplier.

7. The method of claim 1, wherein the electron multiplier is a multichannel plate electron multiplier.

8. The method of claim 1, wherein the gain is set to a value less than 1000.

9. The method of claim 1, wherein the gain is set to a value between 10 and 100.

10. The method of claim 1, wherein the electron multiplier is used to detect ions emerging from a mass spectrometer.

11. The method of claim 1, wherein the gain is set such that an output current of the electron multiplier varies substantially linearly with the total pressure in the space.

12. The method of claim 1, wherein the gain is set such that an output current of the electron multiplier varies substantially linearly with a partial pressure of a constituent gas in the space.

13. An apparatus for measuring a first pressure within a space, a total pressure in the space being in a range of pressures between a lower limit above about 0.1 millitorr and an upper limit of about 100 millitorr, the apparatus comprising:

means for producing an ion related to the first pressure;

an electron multiplier in communication with the space having an input end that receives the ion and an output end through which electrons exit the electron multiplier as a function of the gain of the multiplier;

bias means, connected to the electron multiplier, for applying a bias signal to the electron multiplier to set the gain of the electron multiplier, the bias means being adjusted to set the gain at a sufficiently low level so that the gain is substantially constant with variations in the total pressure in the space; and a current measuring device that receives the electrons exiting the electron multiplier and measures a current induced by the electrons, the current being representative of the first pressure.

14. The apparatus of claim 13, wherein the electron multiplier is a discrete dynode electron multiplier.

15. The apparatus of claim 13, wherein the electron multiplier is a channel electron multiplier.

16. The apparatus of claim 13, wherein the electron multiplier is a microchannel plate electron multiplier.

17. The apparatus of claim 13, wherein the bias means sets the gain to a value less than 1000.

18. The apparatus of claim 13, wherein the bias means sets the gain to a value between 10 and 100.

19. The apparatus of claim 13, wherein the bias means sets the gain such that an output current of the electron multiplier varies substantially linearly with he total pressure in the space through said range of pressures.

20. The apparatus of claim 13, wherein the bias means sets the gain such that an output current of the electron multiplier varies substantially linearly with a partial pressure in the space.

21. The apparatus of claim 13, wherein the space is within a mass spectrometer.

22. A mass spectrometer comprising:

ion source means for providing ions within a confined chamber;

means for establishing a total pressure within the chamber in a range of total pressures having a lower limit above about 0.1 millitorr and an upper limit of about 100 millitorr; and an electron multiplier assembly for generating a current as a function of the number of ions within said chamber, said electron multiplier assembly including:

(i) an electron multiplier for generating electrons as a function of (a) the number of ions detected by the electron multiplier and (b) the gain of the electron multiplier; and (ii) bias signal means for applying a bias signal to the electron multiplier to set the gain of the electron multiplier so that the gain is at a sufficiently low level so as to be substantially constant with variations in the total pressure in the chamber.

23. The mass spectrometer of claim 22, wherein the electron multiplier assembly further includes a current measuring device for receiving the electrons from the electron multiplier and measuring a current induced by the electrons, the current being indicative of a second pressure in the chamber related to a constituent of the contents of the chamber.

24. The mass spectrometer of claim 22, wherein the electron multiplier is a discrete dynode electron multiplier.

25. The mass spectrometer of claim 22, wherein the electron multiplier is a channel electron multiplier.

26. The mass spectrometer of claim 22, wherein the electron multiplier is a microchannel plate electron multiplier.

27. The mass spectrometer of claim 22, wherein the bias signal means sets the gain to a value less than 1000.

28. The mass spectrometer of claim 22, wherein the bias signal means sets the gain to a value between 10 and 100.

29. An apparatus of the type including an electron multiplier disposed in a space so as to measure a first pressure in the space, the apparatus comprising:

means for establishing a total pressure within the space in a range of pressures between a lower limit above about 0.1 millitorr and an upper limit of about 100 millitorr; and means for setting the gain of the multiplier to a sufficiently low level so that the current of electrons exiting the multiplier is indicative of the first pressure and is a function of the gain, the gain being substantially constant with variations in the total pressure in the space.

30. The apparatus of claim 29, further including:

means for receiving an ion at a receiving end of the electron multiplier from the space; and means for detecting electrons exiting the electron multiplier to determine the first pressure.

31. The apparatus of claim 29, wherein the first pressure is a partial pressure of a constituent of the contents of the space.

32. The apparatus of claim 29, wherein the first pressure is the total pressure in the space.

33. The apparatus of claim 29, wherein the electron multiplier is a discrete dynode multiplier.

34. The apparatus of claim 29, wherein the electron multiplier is a channel electron multiplier.

35. The apparatus of claim 29, wherein the electron multiplier is a multichannel plate electron multiplier.

36. The apparatus of claim 29, wherein the gain is set to a value less than 1000.

37. The apparatus of claim 29, wherein the gain is set to a value between 10 and 100.

38. The apparatus of claim 29, wherein said apparatus is a mass spectrometer and the electron multiplier is used to detect ions created within said spectrometer.

39. The apparatus of claim 29, wherein the gain is set such that the electron current exiting the electron multiplier varies substantially linearly with the total pressure in the space.

40. The apparatus of claim 29, wherein the gain is set such that the elctron current exiting the electron multiplier varies substantially linearly with a partial pressure in the space.

* * * * *

UNITED STATES PATENT AND TRADEMARK OFFICE

CERTIFICATE OF CORRECTION

PATENT NO.: 5,866,901

DATED: February 2, 1999

INVENTOR(S): Stephen M. Penn et al.

It is certified that errors appear in the above-identified patent and that said Letters Patent is hereby corrected as shown below:

Claim 19, column 9, line 48, delete "he" and substitute therefor -- the --; and

Claim 40, column 10, line 64, delete "elctron" and substitute therefor -- electron --.

Signed and Sealed this

Tenth Day of August, 1999

*Attest:*

Q. TODD DICKINSON

*Attesting Officer*

*Acting Commissioner of Patents and Trademarks*